United States Patent
Wada et al.

(10) Patent No.: US 10,131,366 B2
(45) Date of Patent: Nov. 20, 2018

(54) HYBRID VEHICLE POWER GENERATION CONTROL APPARATUS

(75) Inventors: Yasuhiko Wada, Tokyo (JP); Hisanori Yamasaki, Tokyo (JP); Keita Hatanaka, Tokyo (JP); Hidetoshi Kitanaka, Tokyo (JP); Yuruki Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 471 days.

(21) Appl. No.: 14/363,140

(22) PCT Filed: Dec. 14, 2011

(86) PCT No.: PCT/JP2011/078885
§ 371 (c)(1),
(2), (4) Date: Jun. 5, 2014

(87) PCT Pub. No.: WO2013/088522
PCT Pub. Date: Jun. 20, 2013

(65) Prior Publication Data
US 2014/0330462 A1 Nov. 6, 2014

(51) Int. Cl.
*B61C 7/04* (2006.01)
*B60L 3/00* (2006.01)
*B60L 11/14* (2006.01)

(52) U.S. Cl.
CPC .............. *B61C 7/04* (2013.01); *B60L 3/0023* (2013.01); *B60L 11/14* (2013.01);
(Continued)

(58) Field of Classification Search
CPC ................................................. Y02T 10/7077
(Continued)

(56) References Cited

U.S. PATENT DOCUMENTS

| 4,533,863 A | * | 8/1985 | Luhn | H02P 9/305 |
| | | | | 322/28 |
| 4,777,425 A | * | 10/1988 | MacFarlane | H02P 9/102 |
| | | | | 322/25 |

(Continued)

FOREIGN PATENT DOCUMENTS

| CN | 101678826 A | 3/2010 |
| JP | 2007-195334 | 8/2007 |
| JP | 2008-042973 | 2/2008 |

OTHER PUBLICATIONS

International Search Report dated Mar. 19, 2012, in PCT/JP11/078885, filed Dec. 14, 2011.
(Continued)

*Primary Examiner* — Minh Truong
*Assistant Examiner* — Michael E Butler
(74) *Attorney, Agent, or Firm* — Oblon, McClelland, Maier & Neustadt, L.L.P.

(57) ABSTRACT

A hybrid-vehicle power generator control apparatus includes an integrated control unit that issues a driving command and a control command to an engine control unit and an electric-power conversion system control unit, respectively, based on requested electric power requested by a load apparatus, and a limiter that limits the control command from the integrated control unit such that when rotation frequency of an electric power generator is same as or lower than a predetermined value, the value of torque generated by the electric power generator becomes smaller than the value of torque generated by an engine. A limitation of the control command by the limiter prevents torques of the engine and the electric power generator from stepping out of the stable operating points.

11 Claims, 7 Drawing Sheets

(52) U.S. Cl.
CPC ....... *B60L 2200/26* (2013.01); *B60L 2210/30* (2013.01); *B60L 2210/40* (2013.01); *B60L 2240/421* (2013.01); *B60L 2240/423* (2013.01); *B60L 2240/441* (2013.01); *B60L 2240/443* (2013.01); *B60L 2270/145* (2013.01); *Y02T 10/642* (2013.01); *Y02T 10/70* (2013.01); *Y02T 10/7077* (2013.01); *Y02T 10/7241* (2013.01); *Y10S 903/902* (2013.01)

(58) Field of Classification Search
USPC .......................................................... 701/19
See application file for complete search history.

(56) References Cited

U.S. PATENT DOCUMENTS

| | | | | |
|---|---|---|---|---|
| 5,483,435 | A * | 1/1996 | Uchino | H02P 9/48 363/127 |
| 5,541,488 | A * | 7/1996 | Bansal | G01P 3/48 318/801 |
| 5,648,705 | A * | 7/1997 | Sitar | H02P 9/48 318/145 |
| 5,789,881 | A * | 8/1998 | Egami | B60K 6/485 180/65.245 |
| 6,018,694 | A * | 1/2000 | Egami | B60K 6/24 180/65.23 |
| 6,054,844 | A * | 4/2000 | Frank | B60K 6/46 180/65.21 |
| 8,584,459 | B2 * | 11/2013 | Richards | F01D 15/10 290/52 |
| 9,235,228 | B2 * | 1/2016 | Gazit | H02M 3/158 |
| 2001/0039230 | A1 * | 11/2001 | Severinsky | B60H 1/004 477/3 |
| 2001/0045101 | A1 * | 11/2001 | Graham | B60H 1/3208 62/236 |
| 2002/0027789 | A1 * | 3/2002 | Okushima | B60L 11/123 363/41 |
| 2003/0088343 | A1 * | 5/2003 | Ochiai | B60K 6/48 701/22 |
| 2005/0093520 | A1 * | 5/2005 | Muramatsu | H02M 7/53871 322/29 |
| 2006/0061335 | A1 * | 3/2006 | Inokuchi | H02P 9/006 322/37 |
| 2006/0086981 | A1 * | 4/2006 | Yamaguchi | H02M 7/003 257/347 |
| 2006/0266256 | A1 * | 11/2006 | Donnelly | B60L 7/06 105/61 |
| 2007/0273342 | A1 * | 11/2007 | Kataoka | H02P 9/006 323/234 |
| 2008/0088282 | A1 * | 4/2008 | Inokuchi | H02P 9/107 322/28 |
| 2009/0242293 | A1 * | 10/2009 | Tanaka | B60K 6/445 180/65.285 |
| 2009/0309416 | A1 * | 12/2009 | Bose | B60K 6/32 307/9.1 |
| 2010/0051367 | A1 | 3/2010 | Yamada et al. | |
| 2010/0206721 | A1 * | 8/2010 | Snidvongs | C25B 1/04 204/229.8 |
| 2011/0098873 | A1 * | 4/2011 | Koga | E02F 9/123 701/22 |
| 2013/0041514 | A1 * | 2/2013 | Apalenek | H02J 7/35 700/287 |
| 2014/0015257 | A1 * | 1/2014 | Dobbs | F02B 63/042 290/40 B |

OTHER PUBLICATIONS

Chinese Office Action issued in Application No. 201180075442.7 dated Sep. 29, 2016 (w/ English Translation).
Combined Chinese Office Action and Search Report dated Jan. 27, 2016 in Patent Application No. 201180075442.7 (with English Translation and English Translation of Categories of Cited Documents).

* cited by examiner

HYBRID VEHICLE POWER GENERATION CONTROL APPARATUS

TECHNICAL FIELD

The present invention relates to a hybrid-vehicle power generator control apparatus that makes an engine drive an electric power generator so as to generate electric power and drives a load apparatus with the generated electric power.

BACKGROUND ART

In general, a railroad vehicle is characterized in that because it travels by means of its iron wheels rolling over rail surfaces, its traveling resistance is smaller than that of an automobile. In particular, in a recent electric railroad vehicle, regenerative brake control is performed in which the main motor is operated as an electric power generator at the braking mode so that braking force is obtained and in which electric energy generated by the main motor at the braking mode is returned to the overhead line so as to be recycled as power running energy for other vehicles. It is known that an electric railroad vehicle equipped with a regenerative brake travels with approximately half energy consumption in comparison with an electric railroad vehicle that is not equipped with any regenerative brake; thus, the foregoing method utilizes the characteristics of a railroad vehicle that has a small traveling resistance.

Meanwhile, it is the present situation that in a local railroad or the like where the transportation density is low, meticulous passenger service is realized at low cost, by utilizing a diesel railcar that does not require any infrastructure such as an overhead line or a substation. However, because a diesel railcar has no means for transferring energy to other vehicles through an overhead line or the like, the recycle of regenerative energy, which is performed by an electric railroad vehicle, has not been carried out. Accordingly, it has been considered that in order to realize energy saving in a diesel railcar, there is no choice but to rely on the development of a high-mileage engine.

As a method of promoting energy saving even for such a diesel railcar, there has been proposed a hybrid diesel railcar in which an engine, an electric power generator, and an electric storage device are combined with one another (e.g., refer to Patent Document 1). In the hybrid diesel railcar, because an electric storage device is provided, it is made possible that at the braking mode, the electric storage device temporarily absorbs generative energy generated by the main motor, and the absorbed regenerative energy is given to the main motor so as to be recycled as part of energy required at the power running mode, so that the energy saving can be realized.

The conventional hybrid diesel railcar disclosed in Patent Document 1 is configured with an engine, an AC power generator that is driven by the engine so as to output AC power, a converter that converts AC power into DC power, an inverter that inverts DC power into AC power, a motor that drives a railroad vehicle, a speed reducer that reduces the rotation of the motor and transfers it to a wheel axle, an electric storage device that has a function of performing charging and discharging with DC power, a service-power-source inverter, a service-power-source transformer, and a control apparatus.

In the hybrid diesel railcar disclosed in Patent Document 1, as far as the output characteristics for the rotation speed of the engine is concerned, when the rotation speed of the engine becomes higher than a given rotation speed, the output of the engine is reduced, and when the rotation speed of the engine becomes lower than a given rotation speed, the output of the engine is raised; the speed command for the converter is utilized in implementing constant-power generation control with a constant load amount, regardless of the rotation speed.

PRIOR ART REFERENCE

Patent Document

[Patent Document 1] Japanese Patent Application Laid-Open No. 2007-195334

DISCLOSURE OF THE INVENTION

Problems to be Solved by the Invention

The main points of the conventional hybrid-diesel-railcar electric power generator control apparatus disclosed in Patent Document 1 are the output point (hereinafter, referred to as an operating point) at which the operation efficiency of the engine is maximum and the power generation control, in accordance with the rotation speed of the engine, of the electric power generator; however, the behavior at a time when the operating point transits is not described in detail. Accordingly, for example, when the electric power generator operation command changes, the rotation frequency cannot be suppressed from suddenly changing and hence the engine may step out, i.e., the engine may come into a stall (hereinafter, referred to as an engine stall).

The present invention has been implemented in order to solve the foregoing problem in a conventional hybrid-vehicle power generator control apparatus; the objective thereof is to provide a hybrid-vehicle power generator control apparatus that prevents the respective torques of an engine and an electric power generator from stepping out of the stable operating points and that stably controls the electric power generator.

Means for Solving the Problems

A hybrid-vehicle power generator control apparatus according to the present invention is characterized by including an electric power generator that is driven by an engine so as to generate AC electric power and supply electric power to a load, a rotation frequency detector that detects a rotation frequency of the electric power generator, an electric-power conversion system that performs electric power conversion between the electric power generator and a load apparatus, an electric-power conversion system control unit that PWM-controls the electric-power conversion system, based on a control command, an integrated control unit that issues a driving command and the control command to the engine control unit and the electric-power conversion system control unit, respectively, based on requested electric power, and a limiter that limits the control command from the integrated control unit in such a way that when the rotation frequency of the electric power generator is the same as or lower than a predetermined value, the value of torque generated by the electric power generator becomes smaller than the value of torque generated by the engine.

Advantage of the Invention

In the hybrid-vehicle power generator control apparatus according to the present invention, the control command from the integrated control unit is limited in such a way that when the rotation frequency of the electric power generator is the same as or lower than a predetermined value, the value of torque generated by the electric power generator becomes smaller than the value of torque generated by the engine; therefore, sudden speed changes and stepping-out of the engine and the electric power generator can be prevented.

BEST MODE FOR CARRYING OUT THE INVENTION

Embodiment 1

Figure 1:
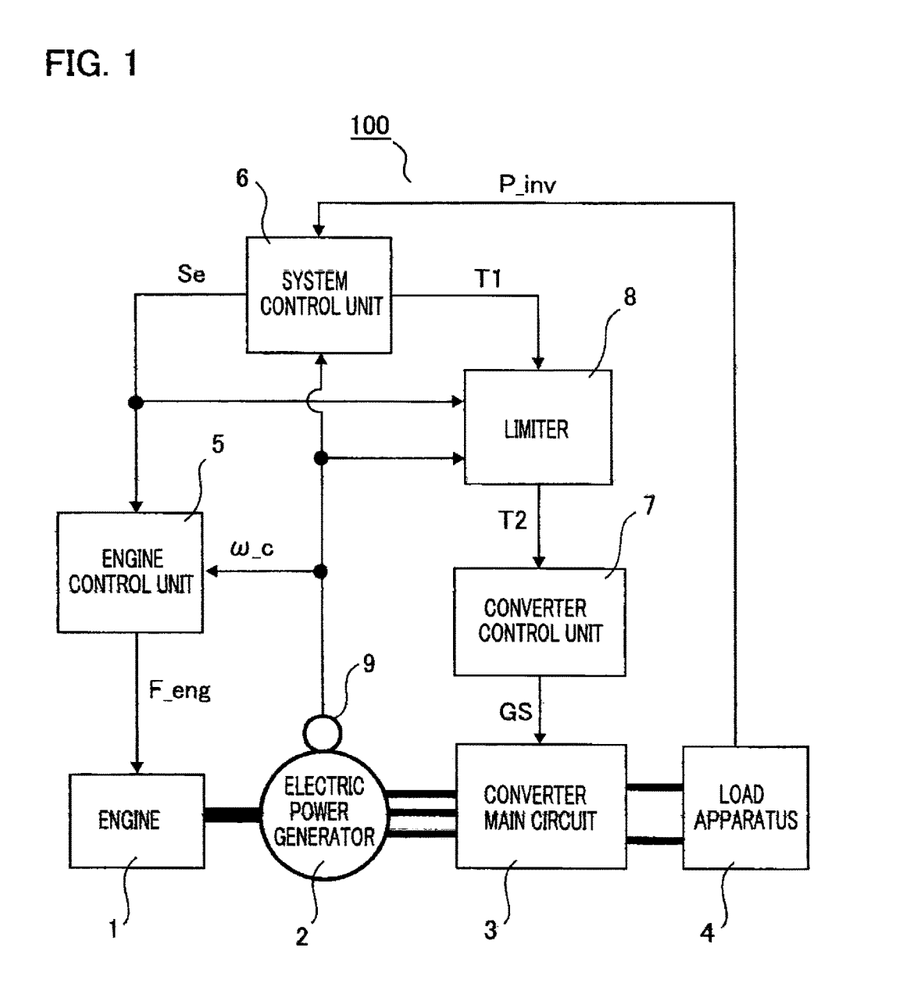
FIG. 1 is a block diagram illustrating the configuration of a hybrid-vehicle power generator control apparatus according to Embodiment 1 of the present invention.

Hereinafter, a hybrid-vehicle power generator control apparatus according to Embodiment 1 of the present invention will be explained with reference to the drawings. FIG. 1 is a system block diagram illustrating the configuration of a hybrid-vehicle power generator control apparatus according to Embodiment 1 of the present invention; the hybrid-vehicle power generator control apparatus illustrated in FIG. 1 is utilized as a driving apparatus for a series-hybrid railroad vehicle.

In FIG. 1, an electric power generator control apparatus 100 is provided with an engine 1, an AC power generator 2 whose rotor shaft (unillustrated) is mechanically coupled with the output shaft (unillustrated) of an engine 1, through the intermediary of a coupler (unillustrated) and that is driven by the engine 1 so as to generate AC power, a converter main circuit 3 as an electric-power conversion system that converts AC power generated by the AC power generator 2 into DC power, a load apparatus 4 electrically connected with the converter main circuit 3, an engine control unit 5 that controls the engine 1, a converter control unit 7 as an electric-power conversion system control unit that controls the converter main circuit 3 so as to control the electric power of the load apparatus 4, a system control unit 6 that issues a driving command and a control command to the engine control unit 5 and the converter control unit 7, respectively, based on requested electric power that is requested by the load apparatus 4, a limiter 8 that applies a limit on the control command issued from the system control unit 6 to the converter control unit 7, and a rotation frequency detector 9 that detects the rotation frequency of the electric power generator 2.

The rotation frequency detector 9 detects a rotation frequency $\omega\_c$ of the electric power generator 2 and outputs the detected rotation frequency $\omega\_c$ to the engine control unit 5, the limiter 8, and the system control unit 6. The rotation frequency detector 9 may also be a rotation speed detector that detects a rotation speed.

Based on a fuel injection amount command F_eng from the engine control unit 5, the fuel injection amount of the engine 1 is controlled, and the engine 1 outputs shaft torque based on the fuel injection amount. The electric power generator 2 is, for example, a three-phase AC power generator; the rotor thereof is rotation-driven by the driving force of the engine 1 so that the electric power generator 2 generates three-phase AC power. The electric power generator 2 can work also as a motor and can consume electric power by cranking and then starting the engine 1 when the engine 1 starts or by making the engine 1 rotate by use of the driving force of the electric power generator 2. Because as described above, the output shaft of the engine 1 and the rotor shaft of the electric power generator 2 are mechanically coupled with each other through the intermediary of the coupler, the rotation frequencies of the engine and the electric power generator coincide with each other.

The converter main circuit 3 receives three-phase AC power outputted from the electric power generator 2, converts the three-phase AC power into DC power, and then outputs the DC power. The load apparatus 4 is provided with, for example, an inverter that inverts DC power into AC power, a motor that drives a vehicle, a speed reducer that reduces the output of the motor so as to transfer the output to the wheel axle, and a battery as an electric storage device that has a charging/discharging control function for performing DC-power charging/discharging; the load apparatus 4 is electrically connected with the converter main circuit 3.

Figure 2:
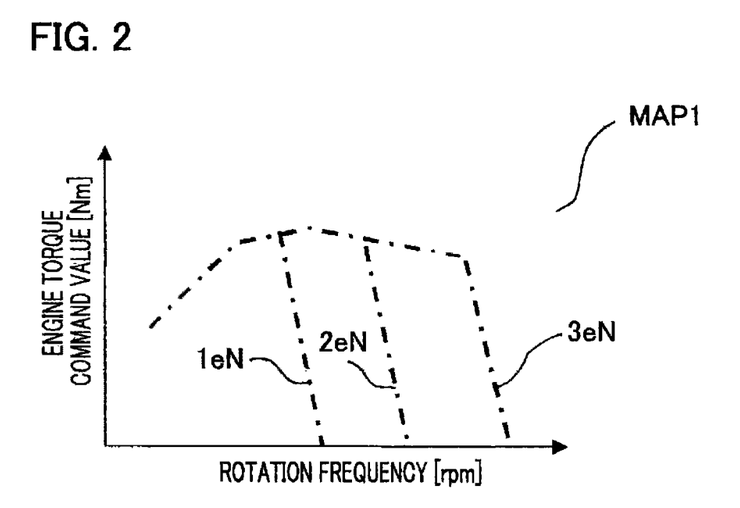
FIG. 2 is an explanatory graph representing an engine torque Characteristic map in a hybrid-vehicle power generator control apparatus according to Embodiment 1 of the present invention.

The engine control unit 5 has two maps, i.e., an engine torque characteristic map and a fuel injection amount characteristic map. FIG. 2 is an explanatory graph representing an engine torque characteristic map in a hybrid-vehicle power generator control apparatus according to Embodiment 1 of the present invention; the ordinate denotes the engine torque command value [Nm], and the abscissa denotes the rotation frequency [rpm] of the engine 1.

As represented in FIG. 2, the engine torque characteristic map MAP1 has a first notch step engine torque characteristic 1eN corresponding to the first notch step of the engine 1, a second notch step engine torque characteristic 2eN corresponding to the second notch step, and a third notch step engine torque characteristic 3eN corresponding to the third notch step. The first notch step, the second notch step, and the third notch step are set in such a way as to correspond to respective rotation speeds of the engine 1. It goes without saying that instead of the foregoing three notch steps, another number of notch steps can be adopted.

The respective engine rotation frequencies corresponding to the first notch step, the second notch step, and the third notch step are each set in such a way as to be higher than the idling rotation frequency of the engine 1. When the notch step rises, the maximum output of the engine 1 also rises.

Figure 3:
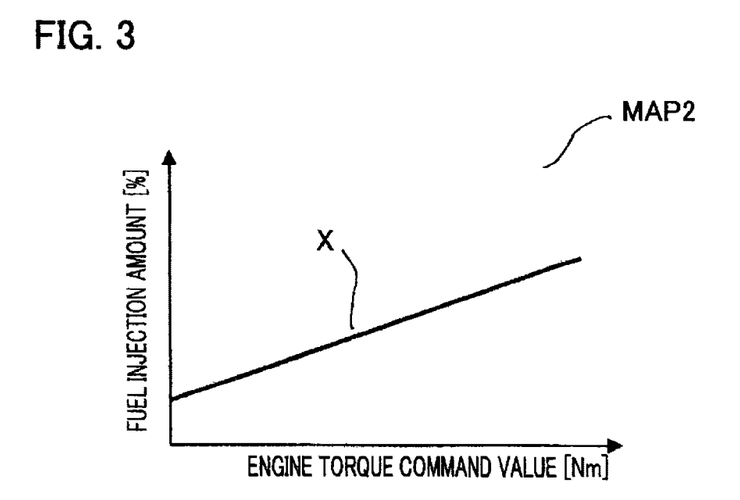
FIG. 3 is an explanatory graph representing a fuel injection amount characteristic map in a hybrid-vehicle power generator control apparatus according to Embodiment 1 of the present invention.

FIG. 3 is an explanatory graph representing the fuel injection amount characteristic map in the hybrid-vehicle power generator control apparatus according to Embodiment 1 of the present invention; the ordinate denotes the fuel injection amount [%] and the abscissa denotes the engine torque command value [Nm]. As represented in FIG. 3, the fuel injection amount characteristic map MAP2 has a fuel injection amount characteristic X in which when the engine torque command value [Nm] increases, the fuel injection amount for the engine 1 also increases.

Figure 4:
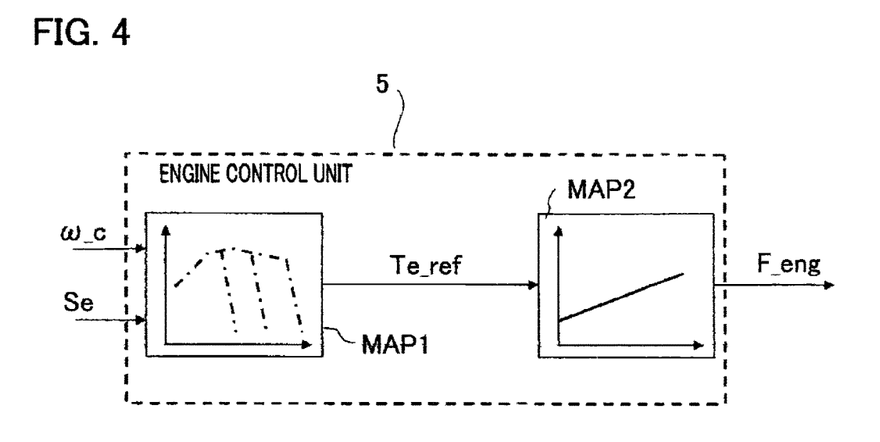
FIG. 4 is a block diagram illustrating control by an engine control unit of a hybrid-vehicle power generator control apparatus according to Embodiment 1 of the present invention.

FIG. 4 is a block diagram illustrating the control by the engine control unit of the hybrid-vehicle power generator control apparatus according to Embodiment 1 of the present invention; as described above, the engine torque characteristic map MAP1 represented in FIG. 2 and the fuel injection amount characteristic map MAP2 represented in FIG. 3 are included therein. In FIG. 4, based on a driving command Se from the system control unit 6, the engine control unit 5 extracts and creates from the engine torque characteristic map MAP1 an engine torque command value Te_ref corresponding to the rotation frequency $\omega\_c$ of the electric power generator 2 detected by the after-mentioned rotation frequency detector 9, extracts and creates from the fuel injection amount characteristic map MAP2 the fuel injection amount command F_eng for instructing the fuel injection amount corresponding to the created engine torque command value Te_ref, and then controls the fuel injection amount of the engine 1, based on the created fuel injection amount command F_eng.

Next, the system control unit 6 will be explained. In FIG. 1, in order to supply electric power to the load apparatus 4, the system control unit 6 controls the engine 1 and the electric power generator 2 by way of the control unit 5 and the converter control unit 7, respectively. Specifically, in accordance with the requested electric power value P_inv, the system control unit 6 outputs the driving command Se to the engine control unit 5 and a converter torque command value T1, as a control command, to the limiter 8.

Figure 5:
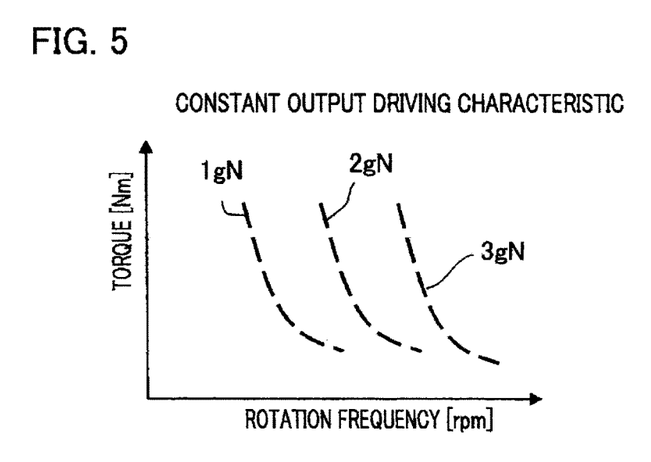
FIG. 5 is an explanatory graph representing an electric power generator torque characteristic map in a hybrid-vehicle power generator control apparatus according to Embodiment 1 of the present invention.

On the other hand, the system control unit 6 has an electric power generator torque characteristic map; as described later, based on the electric power generator torque characteristic map, the system control unit 6 controls the engine 1 and the electric power generator 2. FIG. 5 is an explanatory graph representing the electric power generator torque characteristic map in the hybrid-vehicle power generator control apparatus according to Embodiment 1 of the present invention; the ordinate denotes the torque [Nm] of the electric power generator, and the abscissa denotes the rotation frequency [rpm] of the electric power generator.

The electric power generator torque characteristic map MAP3 represented in FIG. 5 has a first notch step electric power generator torque characteristic 1gN corresponding to the first notch step of the engine 1, a second notch step electric power generator torque characteristic 2gN corresponding to the second notch step, and a third notch step electric power generator torque characteristic 3gN corresponding to the third notch step. As represented in FIG. 5, the electric power generator torque characteristics 1gN through 3gN each have a characteristic in inverse proportion to the rotation frequency $\omega\_c$ of the electric power generator 2 so that the electric power generator 2 outputs constant electric power.

Figure 6:
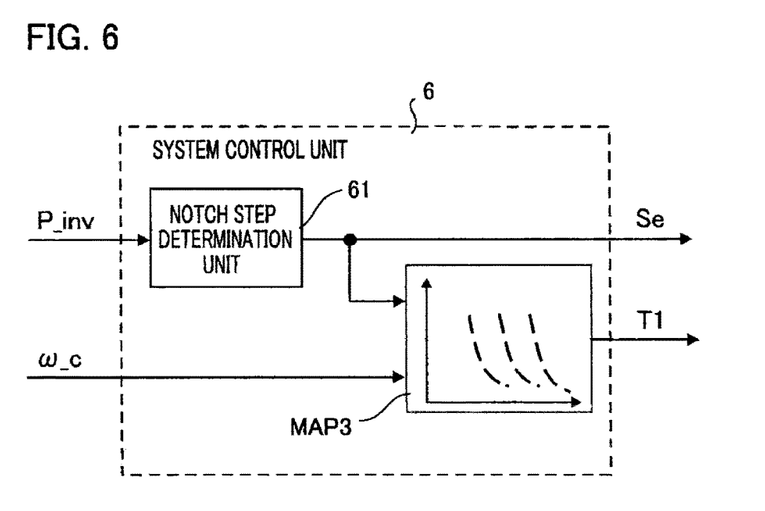
FIG. 6 is a block diagram illustrating control by a system control unit of a hybrid-vehicle power generator control apparatus according to Embodiment 1 of the present invention.

FIG. 6 is a block diagram illustrating the control by the system control unit of the hybrid-vehicle power generator control apparatus according to Embodiment 1 of the present invention; a notch step determination unit 61 that performs determination on the notch step of the engine 1 and the electric power generator torque characteristic map MAP3 represented in FIG. 5 are included therein. The notch step determination unit 61 has a threshold value for selecting one of the first notch step electric power generator torque characteristic 1gN, the second notch step electric power generator torque characteristic 2gN, and the third notch step electric power generator torque characteristic 3gN of the electric power generator torque characteristic map MAP3, in accordance with the requested electric power value P_inv from the load apparatus 4.

In FIG. 6, the notch step determination unit 61 in the system control unit 6 outputs the driving command Se corresponding to the requested electric power value P_inv inputted from the load apparatus 4 to the engine control unit 5, the limiter 8, and the electric power generator torque characteristic map MAP3 provided inside the system control unit 6. Based on the driving command Se from the notch step determination unit 61 and the rotation frequency $\omega\_c$ of the electric power generator 2 detected by the rotation frequency detector 9, the system control unit 6 searches for the converter torque command value T1 for controlling the electric power generator 2 in the electric power generator torque characteristic map MAP3 and outputs the converter torque command value T1 to the limiter 8.

Figure 7:
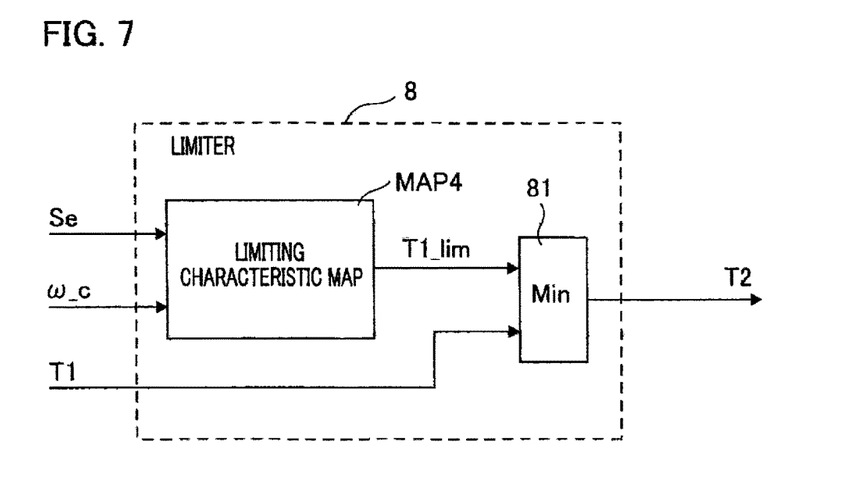
FIG. 7 is a block diagram illustrating control by a limiter of a hybrid-vehicle power generator control apparatus according to Embodiment 1 of the present invention.

Next, the limiter 8 will be explained. FIG. 7 is a block diagram illustrating the control by the limiter of the hybrid-vehicle power generator control apparatus according to Embodiment 1 of the present invention. In FIG. 7, the limiter 8 has a limiting characteristic map MAP4 and a comparator 81. The limiting characteristic map MAP4 is a map where a converter torque limit value T1_lim corresponding to the driving command Se and the rotation frequency $\omega\_c$ of the electric power generator 2 is stored. The converter torque limit value T1_lim stored in the limiting characteristic map MAP4 is set for each of the first notch step 1N through the third notch step 3N of the engine 1; as described later, the converter torque limit value T1_lim is set to be lower than the maximum torque characteristic of the engine 1 at each of the first notch step 1N through the third notch step 3N.

When for example, the driving command Se designates the first notch step, the limiter 8 extracts the converter torque limit value T1_lim corresponding to the first notch step from the limiting characteristic map MAP4, at a low rotation frequency where the rotation frequency $\omega\_c$ of the electric power generator 2 is smaller than a predetermined value for the first notch step; then, the limiter 8 outputs the converter torque limit value T1_lim. Moreover, when the driving command Se designates the second notch step, the limiter 8 extracts the converter torque limit value T1_lim corresponding to the second notch step from the limiting characteristic map MAP4, at a low rotation frequency where the rotation frequency ω_c of the electric power generator 2 is smaller than a predetermined value for the second notch step; then, the limiter 8 outputs the converter torque limit value T1_lim. Furthermore, when the driving command Se designates the third notch step, the limiter 8 extracts the converter torque limit value T1_lim corresponding to the third notch step from the limiting characteristic map MAP4, at a low rotation frequency where the rotation frequency ω_c of the electric power generator 2 is smaller than a predetermined value for the first notch step; then, the limiter B outputs the converter torque limit value T1_lim. The specific method of setting the converter torque limit value T1_lim in the limiting characteristic map MAP4 will be described later.

The comparator 81 compares the converter torque command value T1 outputted from the system control unit 6 with the converter torque limit value T1_lim extracted from the limiting characteristic map MAP4 and outputs smaller one of them, as a converter torque command value T2, to the converter control unit 7. In accordance with the driving command Se from the system control unit 6 and the rotation frequency ω_c of the electric power generator 2 detected by the rotation frequency detector 9, the limiter 8 limits the converter torque command value T1 from the system control unit 6 and then outputs the converter torque command value T2. As described above, limitation of the converter torque command value makes it possible to balance the engine torque with the electric power generator torque, thereby preventing stepping-out, described later.

The converter torque command value T2 outputted from the limiter 8 is inputted to the converter control unit 7. As described above, the inputted converter torque command value T2 is the smaller one of the converter torque limit value T1_lim outputted from the limiting characteristic map MAP4 and the converter torque command value T1 outputted from the system control unit 6. Based on the inputted converter torque command value T2, the converter control unit 7 creates a three-phase voltage command value, generates a gate signal GS corresponding to the three-phase voltage command value, and inputs the gate signal GS to the gate of a switching device included in the converter main circuit 3. The converter main circuit 3 is PWM-controlled based on the gate signal GS from the converter control unit 7.

The hybrid-vehicle power generator control apparatus according to Embodiment 1 of the present invention is configured in such a manner as described above; in accordance with the requested electric power value P_inv of the load apparatus 4, the system control unit 6 controls the engine 1 by way of the engine control unit 5 and the electric power generator 2 by way of the limiter 8 and the converter control unit 7. In this situation, as described above, the electric power generator 2 is controlled in accordance with the notch step of the engine 1, so that electric power corresponding to the notch step of the engine 1 can be supplied to the load apparatus 4.

Meanwhile, when in a transient mode where the notch steps of the engine 1 are switched, the balance between the torque control of the engine 1 and the torque control of the electric power generator 2 is not appropriate, stepping-out may be caused. The "stepping-out" here denotes a so-called engine stall phenomenon in which while the torque of the electric power generator 2 is sill larger than the torque of the engine 1, the engine rotation speed is reduced and hence the engine stops.

As described above, in accordance with the driving command Se from the system control unit 6 and the rotation frequency ω_c of the electric power generator 2 from the rotation frequency detector 9, the engine 1 operates in such a way as to generate an engine shaft output P_eng, based on the fuel injection amount command F_eng outputted from the engine control unit 5. Here, when it is assumed that the engine system is an ideal one without any friction resistance, the engine shaft output P_eng is given by the equation (1) below, by use of engine torque τ_eng and an engine rotation frequency ω_eng.

$$P\_eng = \tau\_eng \times \omega\_eng \quad (1)$$

Meanwhile, as described above, the electric power generator 2 that supplies electric power to the load apparatus 4 is PWM-controlled, by way of the converter main circuit 3, by the gate signal GS outputted from the converter control unit 7 based on the converter torque command value T2 from the limiter 8, so that the electric power generator 2 outputs electric power generator torque τ_gen to the engine 1. Here, letting ω_gen and τ_gen denote an electric power generator rotation frequency and electric power generator torque, respectively, the electric power generator output P_eng is given by the equation (2) below.

$$P\_gen = \tau\_gen \times \omega\_gen \quad (2)$$

Moreover, when it is defined that an engine acceleration torque Δτ is the difference between the engine torque τ_eng and the electric power generator torque τ_gen, the engine acceleration torque Δτ is given by the equation (3) below.

$$\Delta\tau = \tau\_eng - \tau\_gen \quad (3)$$

Figure 8:
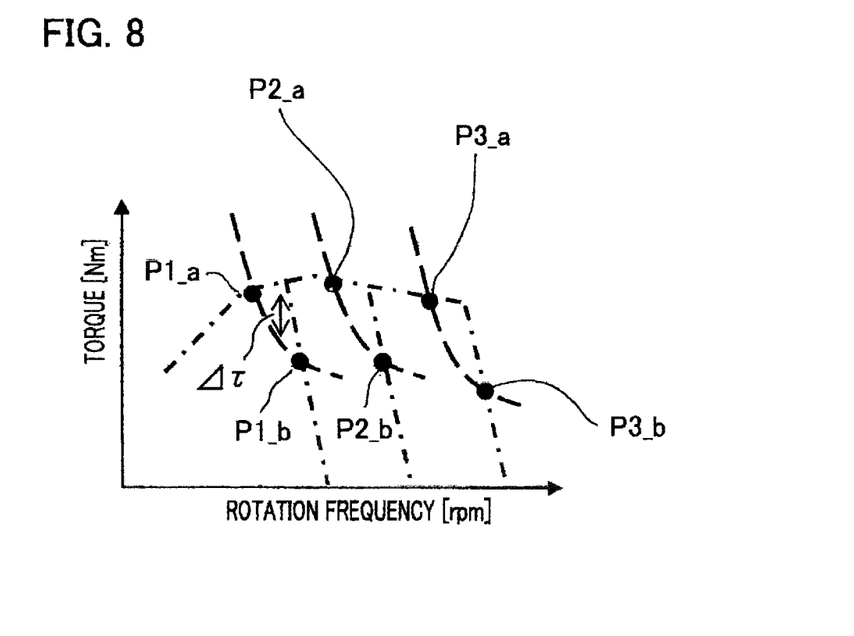
FIG. 8 is an explanatory graph representing the relationship between an engine torque characteristic and an electric power generator torque characteristic in a hybrid-vehicle power generator control apparatus according to Embodiment 1 of the present invention.

FIG. 8 is an explanatory graph representing the relationship between an engine torque characteristic and the electric power generator torque characteristic in the hybrid-vehicle power generator control apparatus according to Embodiment 1 of the present invention; the ordinate denotes the torque, and the abscissa denotes the rotation frequency. FIG. 8 represents a chart where the engine torque characteristic map MAP1 represented in FIG. 2 and the electric power generator torque characteristic map MAP3 represented in FIG. 5 are superimposed on each other. As represented in FIG. 8, the engine acceleration torque Δτ given by the equation (3) is expressed as the difference between the engine torque characteristic (represented by a one-dot chain line) and the electric power generator torque characteristic (represented by a chain line) at a given notch step.

In order to supply stable electric power to the load apparatus 4, the engine acceleration torque Δτ given by the equation (3) should be "0". In other words, when the engine acceleration torque Δτ given by the equation (3) is controlled so as to be "0", generated electric power without power fluctuation can be supplied to the load apparatus 4.

For example, it is assumed that the system is not provided with the limiter 8 and the foregoing control method is applied thereto; as represented in FIG. 8, when the system control unit 6 outputs the driving command Se for the first notch step, both an operating point P1_a and an operating point P1_b, at which the first notch step engine torque characteristic 1eN and the first notch step electric power generator torque characteristic 1gN are equal to each other, are candidates of the steady operating point.

When the system control unit 6 outputs the driving command Se for the second notch step, both an operating point P2_a and an operating point P2_b, at which the second notch step engine torque characteristic 2eN and the second notch step electric power generator torque characteristic 2gN are equal to each other, are candidates of the steady operating point; when the system control unit 6 outputs the driving command Se for the third notch step, both an operating point P3_a and an operating point P3_b, at which the third notch step engine torque characteristic 3eN and the third notch step electric power generator torque characteristic 3gN are equal to each other, are candidates of the steady operating point.

Figure 9:
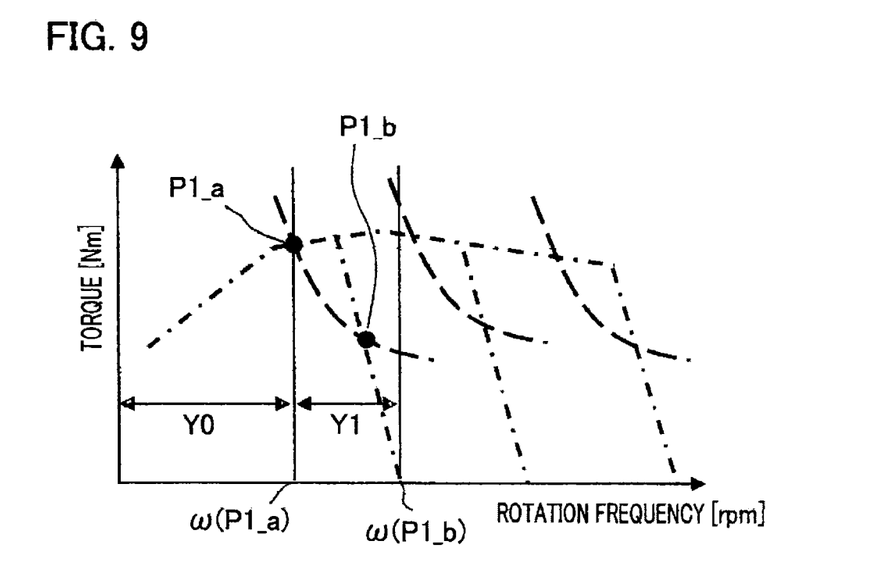
FIG. 9 is an explanatory graph representing operating-point transition in accordance with a notch step in a hybrid-vehicle power generator control apparatus according to Embodiment 1 of the present invention.

Next, the transition of the operating point at each notch step will be explained in more detail. FIG. 9 is an explanatory graph representing steady-operating-point transition in accordance with a notch step in the hybrid-vehicle power generator control apparatus according to Embodiment 1 of the present invention; the ordinate denotes the torque, and the abscissa denotes the rotation frequency. In FIG. 9, as an example, two steady operating points P1_a and P1_b at the first notch step are shown. The respective rotation frequencies of the electric power generator 2 at the steady operating points P1_a and P1_b are ω(P1_a) and ω(P1_b).

At the first notch step, operating points other than the two steady operating points P1_a and P1_b are transient operating points. At the steady operating points P1_a and P1_b, the engine acceleration torque Δτ given by the equation (3) is "0"; however, at a transient operating point, the engine acceleration torque Δτ given by the equation (3) is not "0". Similarly, also at either the second notch step or the third notch step, the engine acceleration torque Δτ is not "0" at an operation point other than a steady operation point.

Next, the behaviors of the engine 1 and the electric power generator 2 in the vicinity of the steady operating points P1_a and P1_b represented in FIG. 9 will be explained.

[Mode 1a]

At first, as Mode 1, it is assumed that a transient operating point 1a (not represented) exists in the vicinity of the steady operating point P1_a, that the rotation speed ω(t) at the transient operating point 1a is lower than the rotation frequency ω(P1_a) at the steady operating point P1_a, and that the relationship between these rotation frequencies is given by the equation below.

$$\omega(t) < \omega(P1\_a)$$

In this case, as the transient operating point 1a, there exist two points, i.e., the transient operating point 1a (not represented) on the electric power generator torque characteristic 1gN and the transient operating point 1a (not represented) on the engine torque characteristic 1eN. Furthermore, in this case, as evident from FIG. 9, the torque at the transient operating point 1a on the electric power generator torque characteristic 1gN is larger than the torque at the transient operating point 1a on the engine torque characteristic 1eN. Accordingly, the engine acceleration torque Δτ given by the equation (3) becomes a negative value; acceleration torque is produced in the electric power generator 2 and hence the rotation frequency (1a)ω(t) decreases more and more; the transient operating point 1a on the electric power generator torque characteristic 1gN and the transient operating point 1a on the engine torque characteristic 1eN diverge from each other; as a result, stepping-out, i.e., an engine stall occurs. Y0 in FIG. 9 denotes a divergence region where the two transient operating points 1a diverge from each other and hence stepping-out (an engine stall) occurs.

[Mode 2a]

Next, it is assumed that a transient operating point 2a (not represented) exists in the vicinity of the steady operating point P1_a, that the rotation speed ω(t) at the transient operating point 2a is the same as the rotation frequency ω(P1_a) at the steady operating point P1_a, and that the relationship between these rotation frequencies is given by the equation below.

$$\omega(t) = (P1\_a)$$

In this case, the engine acceleration torque Δτ given by the equation (3) becomes "0", and the transient operating point 2a (not represented) on the electric power generator torque characteristic 1gN and the transient operating point 2a on the engine torque characteristic 1eN coincide with the steady operating point P1_a and remain there.

[Mode 3a]

Next, it is assumed that a transient operating point 3a (not represented) exists in the vicinity of the steady operating point P1_a, that the rotation speed ω(t) at the transient operating point 3a is higher than the rotation frequency ω(P1_a) at the steady operating point P1_a but is lower than the rotation frequency ω(P1_b) at the steady operating point P1_b, and that the relationship between these rotation frequencies is given by the equation below.

$$\omega(P1\_a) < \omega(t) < \omega(P1\_b)$$

In this case, there exist two points, i.e., the transient operating point 3a (not represented) on the electric power generator torque characteristic 1gN and the transient operating point 3a (not represented) on the engine torque characteristic 1eN. The engine acceleration torque Δτ given by the equation (3) becomes a positive value; engine acceleration torque is produced in the engine 1 and hence the rotation frequency increases; thus, the two transient operating points 3a converge together at the steady operating point P1_b. Y1 in FIG. 9 denotes a convergence region where the two transient operating points 3a converge together at the steady operating point P1_b.

[Mode 1b]

Next, it is assumed that a transient operating point 1b (not represented) exists in the vicinity of the other steady operating point P1_b, that the rotation speed ω(t) at the transient operating point 1b is lower than the rotation frequency ω(P1_b) at the steady operating point P1_b but is higher than the rotation frequency (P1_a) at the steady operating point P1_a, and that the relationship between these rotation frequencies is given by the equation below.

$$\omega(P1\_a) < \omega(t) < \omega(P1\_b)$$

In this case, there exist two points, i.e., the transient operating point 1b (not represented) on the electric power generator torque characteristic Δτ and the transient operating point 1b not represented) on the engine torque characteristic 1eN. The engine acceleration torque Δτ given by the equation (3) becomes a positive value; engine acceleration torque is produced in the engine 1 and hence the rotation frequency increases; thus, the two transient operating points 1b converge together at the steady operating point P1_b.

[Mode 2b]

Next, it is assumed that a transient operating point 2b (not represented) exists in the vicinity of the steady operating point P1_b, that the rotation speed ω(t) at the transient operating point 2b is the same as the rotation frequency ω(P1_b) at the steady operating point P1_b, and that the relationship between these rotation frequencies is given by the equation below.

$$\omega(t) = \omega(P1\_b)$$

In this case, the engine acceleration torque Δτ given by the equation (3) becomes "0", and the transient operating point 2a (not represented) on the electric power generator torque characteristic 1gN and the transient operating point 2a on the engine torque characteristic 1eN converge together at the steady operating point P1_b.

[Mode 3b]

Next, it is assumed that a transient operating point 3b (not represented) exists in the vicinity of the steady operating point P1_b, that the rotation speed ω(t) at the transient operating point 3b is lower than the rotation frequency ω(P1_b) at the steady operating point P1_b, and that the relationship between these rotation frequencies is given by the equation below.

$$\omega(t) > \omega(P1\_b)$$

In this case, there exist two points, i.e., the transient operating point 3b (not represented) on the electric power generator torque characteristic 1gN and the transient operating point 3b (not represented) on the engine torque characteristic 1eN. The engine acceleration torque given by the equation (3) becomes a negative value; torque is produced in the electric power generator 2 and hence the rotation frequency decreases; thus, the two transient operating points 3b converge together at the steady operating point P1_b.

From the above facts, it is learned that in [Mode 1a], because the transient operating points of the electric power generator 2 and the engine 1 maintain [Δτ<0] in the equation (3), stepping-out occurs. Moreover, in [Mode 2a], the transient operating points converge together at the steady operating point P1_a; however, when due to a disturbance or the like, the steady operating point moves to a rotation frequency region lower than ω(P1_a), the operating point is trapped at the transient operating point of [Mode 1a] and hence stepping-out occurs.

As described above, in the case where the limiter 8 is not provided, when the transient operating point exists at a point where the rotation frequency is lower than the steady operating point P1_a, stepping-out occurs; when the transient operating point exists in the vicinity of the steady operating point P1_b, the transient operating points converge together at the steady operating point P1_b. In the foregoing explanation, only the first notch step has been described; however, because also in the case of either the second notch step or the second notch step, the relationship between the engine torque and the electric power generator torque is the same as that at a time when the first notch step is selected, the behavior is the same as that at a time when the first notch step is selected.

Figure 10:
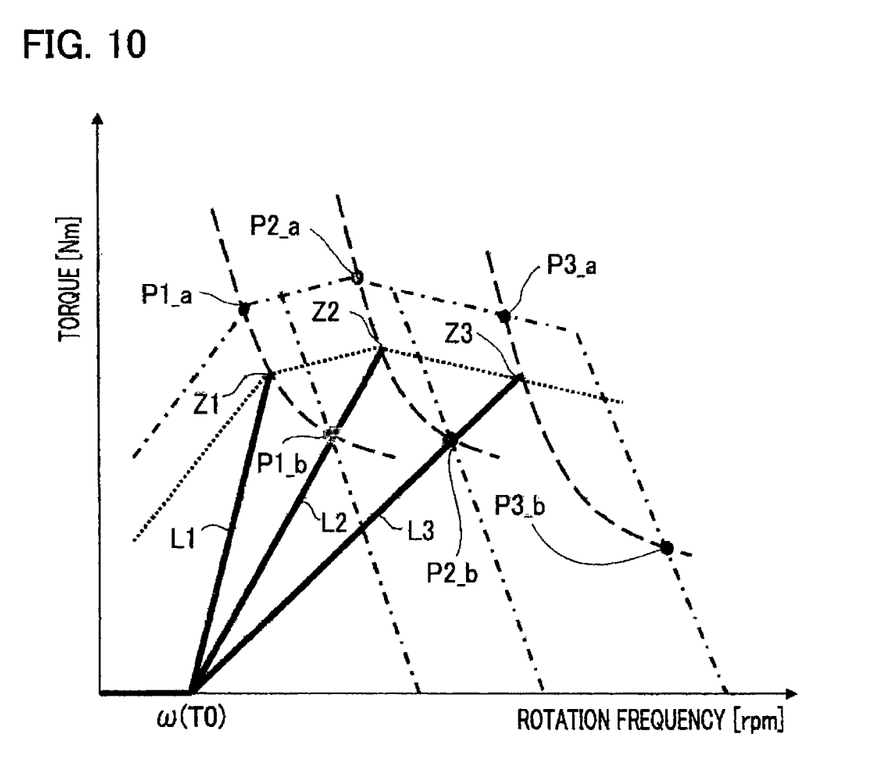
FIG. 10 is an explanatory graph representing a limiting characteristic map in a hybrid-vehicle power generator control apparatus according to Embodiment 1 of the present invention.

Next, the limiter 8 will be explained. FIG. 10 is an explanatory graph representing a limiting characteristic map in the hybrid-vehicle power generator control apparatus according to Embodiment 1 of the present invention; the ordinate denotes the torque[Nm], and the abscissa denotes the rotation frequency[rpm]. The limiting characteristic map MAP4 represented in FIG. 10 is provided in the limiter 8. In FIG. 10, the first notch step engine torque characteristic 1eN, the second notch step engine torque characteristic 2eN, and the third notch step engine torque characteristic 3eN are the same as the respective ones represented in the engine torque characteristic map MAP1; the first notch step electric power generator torque characteristic 1gN, the second notch step electric power generator torque characteristic 2gN, and the third notch step electric power generator torque characteristic 3gN are the same as the respective ones represented in the engine torque characteristic map MAP1. "Z" curve represented by a broken line is a max-torque-10%-reduced characteristic where the engine torque is reduced by 10% with respect to the maximum torque.

Setting of the max-torque-10%-reduced characteristic Z to a value that is 10% smaller than the maximum torque of the engine is based on the assumption that the variation in the actual output torque of the engine 1 is approximately 10%; however, it goes without saying that the max-torque-10%-reduced characteristic Z may be reduced to a value other than the value that is 10% smaller than the maximum torque of the engine.

L1 denotes a first notch step electric power generator torque limiting characteristic and is represented by a straight line that connects the torque "0" point at a predetermined rotation frequency ω(t0) of the engine 1 and the electric power generator 2 with the intersection point Z1 of the first notch step electric power generator torque characteristic 1gN with the max-torque-10%-reduced characteristic 2. In other words, the first notch step electric power generator torque limiting characteristic L1 is set in such a way that the output torque is made to be "0" up to a predetermined rotation frequency ω(t0) of the engine 1 and the electric power generator 2 and that the torque "0" point at the predetermined rotation frequency ω(t0) is connected by a straight line with the intersection point Z1 of the first notch step electric power generator torque characteristic 1gN between the steady operating point P1_a and the steady operating point P1_b with the max-torque-10%-reduced characteristic Z.

L2 denotes a second notch step electric power generator torque limiting characteristic and is represented by a straight line that connects the torque "0" point at a predetermined rotation frequency ω(t0) of the engine 1 and the electric power generator 2 with the intersection point Z2 of the second notch step electric power generator torque characteristic 2gN with the max-torque-10%-reduced characteristic Z. In other words, the second notch step electric power generator torque limiting characteristic L2 is set in such a way that the output torque is made to be "0" up to a predetermined rotation frequency ω(t0) of the engine 1 and the electric power generator 2 and that the torque "0" point at the predetermined rotation frequency ω(t0) is connected by a straight line with the intersection point Z2 of the second notch step electric power generator torque characteristic 2gN between the steady operating point P2_a and the steady operating point P2_b with the max-torque-10%-reduced characteristic Z.

L3 denotes a third notch step electric power generator torque limiting characteristic and is represented by a straight line that connects the torque "0" point at a predetermined rotation frequency ω(t0) of the engine 1 and the electric power generator 2 with the intersection point Z3 of the third notch step electric power generator torque characteristic 3gN with the max-torque-10%-reduced characteristic Z. In other words, the third notch step electric power generator torque limiting characteristic L3 is set in such a way that the output torque is made to be "0" up to a predetermined rotation frequency ω(t0) of the engine 1 and the electric power generator 2 and that the torque "0" point at the predetermined rotation frequency ω(t0) is connected by a straight line with the intersection point Z3 of the third notch step electric power generator torque characteristic 3gN between the steady operating point P3_a and the steady operating point P3_b with the max-torque-10%-reduced characteristic Z.

The limiter 8 extracts from the limiting characteristic map MAP5 the converter torque limit value T1_lim corresponding to the driving command Se and the rotation frequency ω_c of the electric power generator 2; then, the limiter 8 outputs smaller one of the extracted converter torque limit value T1_lim and the converter torque command value T1 from the system control unit 6, as the converter torque command value T2, to the converter control unit 7.

In the limiter 8, in accordance with the driving command Se for the engine 1, the respective limiting characteristics for the notches are switched.

As described above, because the limiter 8 limits the electric power generator torque value to a value the same as or smaller than the torque value of the engine, in accordance with the notch step of the engine 1, the shaft torque value $\tau\_eng$ of the engine 1 and the torque value $\tau\_gen$ of the electric power generator 2 are prevented from shifting from the respective steady operating points P1_b, P2_b, and P3_b and hence the operating point does not move to the steady operating point P1_a, P2_a, or P 3_a; thus, stepping-out can be prevented.

In the case where the limiting characteristic has a torque characteristic where the rotation frequency is lower than a desired rotation frequency and the torque characteristic is lower than the engine maximum torque characteristic, stability can be ensured even when the operating point exists above the engine torque characteristic MAP. As an example, in the case where it is anticipated that the variation in the actual engine torque output is approximately 10%, a torque characteristic that is approximately 10% lower than the design value of the engine torque characteristic is provided in the limiting characteristic, so that even when a variation or the like exists in the lubrication condition of the engine 1, stepping-out can be prevented.

In the hybrid-vehicle power generator control apparatus according to Embodiment 1 of the present invention, the limiter makes it possible to provide the electric power generator torque characteristic where the operating point for each notch is prevented from moving to the foregoing Mode 1a; therefore, stepping-out can be prevented.

Moreover, because in accordance with the driving command Se for the engine 1, the respective limiting characteristics for the notches are switched, there is set a transition characteristic in accordance with the switching of the driving commands; thus, transition to the steady operating point for each notch can more smoothly be implemented.

Embodiment 2

Next, there will be explained a hybrid-vehicle power generator control apparatus according to Embodiment 2 of the present invention. The hybrid-vehicle power generator control apparatus according to Embodiment 2 is different from the hybrid-vehicle power generator control apparatus according to Embodiment 1 in the method for signal processing performed in the system control unit 6. The other configurations are the same as those in Embodiment 1.

Figure 11:
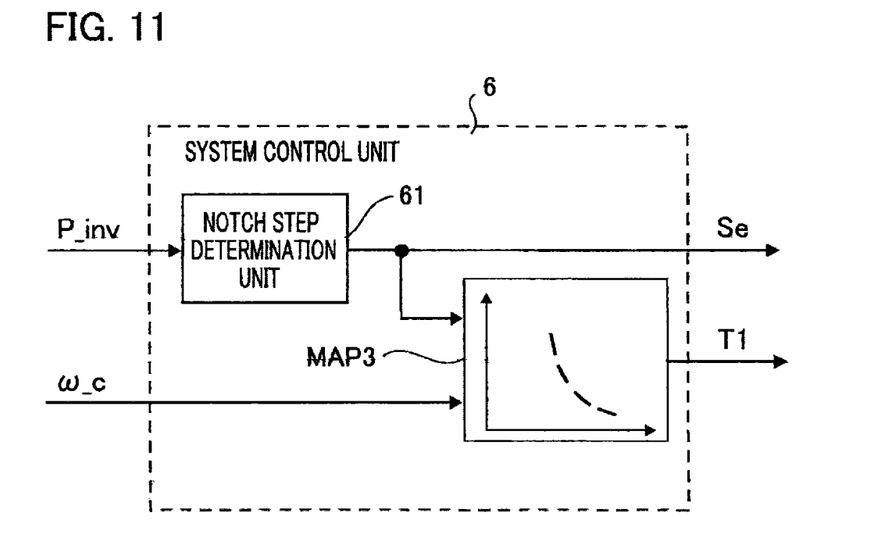
FIG. 11 is a block diagram illustrating control by a system control unit of a hybrid-vehicle power generator control apparatus according to Embodiment 2 of the present invention.

FIG. 11 is a block diagram illustrating the control by the system control unit of the hybrid-vehicle power generator control apparatus according to Embodiment 2 of the present invention. FIG. 11 illustrates the configuration of the system control unit 6 in which neither the engine 1 nor the electric power generator 2 is provided with a notch step. This configuration is different from the configuration (FIG. 6) of the system control unit 6 according to Embodiment 1, in which both the engine 1 and the electric power generator 2 are each provided with the notch steps, in terms of the number of threshold values in the notch step determination unit 61 and the configuration of the electric power generator torque characteristic map MAP3.

Specifically, when receiving the requested electric power value P_inv from the load apparatus 4, the notch step determination unit 61 outputs a speed target driving command Se to the engine control unit 5, the limiter 8, and the electric power generator torque characteristic MAP3 without any notch step. The speed target driving command Se is an on/off signal; in the case of "ON", control can be performed in the same manner as Embodiment 1; however, in the case of "OFF", the converter torque command value T1 is not outputted.

The electric power generator torque characteristic MAP3 without any notch step outputs the converter torque T1 corresponding to the electric power generator rotation frequency $\omega\_c$ detected by the rotation frequency detector 9. Accordingly, in the case where the driving command Se for the engine is not a notch switching command but a speed characteristic desired command for only one step, the speed target driving command Se from the system control unit 6 is on/off-controlled, so that control of the electric power generator can be performed in the same manner as that in Embodiment 1; thus, there is demonstrated an effect that stepping-out is prevented.

Embodiment 3

Figure 12:
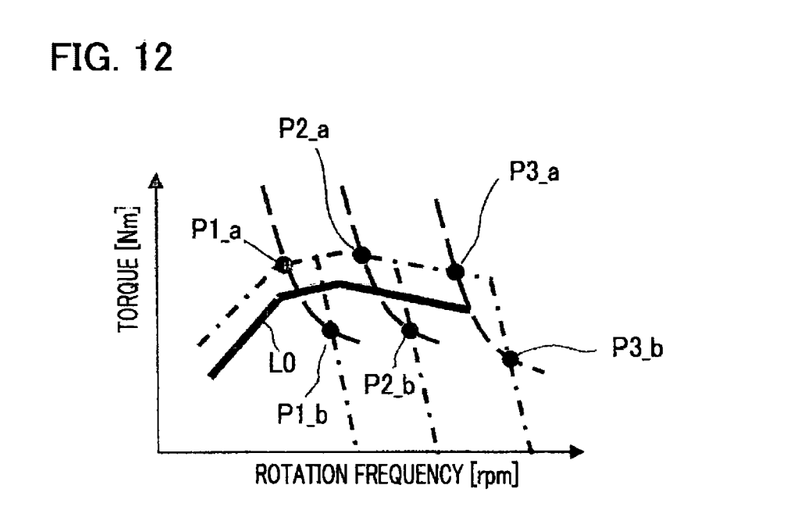
FIG. 12 is an explanatory graph representing a limiting characteristic map in a hybrid-vehicle power generator control apparatus according to Embodiment 3 of the present invention.

Next, there will be explained a hybrid-vehicle power generator control apparatus according to Embodiment 3 of the present invention. FIG. 12 is an explanatory graph representing a limiting characteristic map in the hybrid-vehicle power generator control apparatus according to Embodiment 3 of the present invention.

In Embodiment 3, the signals inputted to or outputted from the respective constituent blocks are the same as those in Embodiment 1; however, the configuration of the limiting characteristic MAP5 of the limiter 8 is different from that in Embodiment 1. The other configurations are the same as those in Embodiment 1.

In FIG. 12, as represented by a solid line, the limiting characteristic MAP5 is provided with a common engine torque limiting characteristic L0 that does not depend on the notch steps but lies across the notches. Specifically, the engine torque limiting characteristic L0 is provided at respective positions that are in idling-mode engine rotation frequency regions along the engine torque characteristics 1eN, 2eN, and 3eN of the respective notches and at which the engine torques are approximately 10% lower than the engine maximum torques at the rotation frequencies that are the same as or lower than the respective rotation frequencies at the steady operating points P1_a, P2_a, and P3_a. As a result, when the engine torque limiting characteristic L0 is preliminarily stored in an operating point region where the fuel efficiency of the engine 1 is excellent, power-generation control having a high fuel-consumption efficiency can be implemented.

INDUSTRIAL APPLICABILITY

The present invention can be utilized as a power generator control apparatus for a hybrid vehicle, especially, for a railroad hybrid vehicle.

DESCRIPTION OF REFERENCE NUMERALS

1: engine
2: electric power generator
3: converter main circuit
4: load apparatus
5: engine control unit
6: system control unit
7: converter control unit
8: limiter
9: rotation frequency detector
61: notch determination unit 81: comparator
MAP1: engine torque characteristic map
MAP2: fuel injection amount characteristic map
MAP3: electric power generator torque characteristic map
MAP4, MAP5: limiting characteristic map

The invention claimed is:

1. An electric power generator control apparatus comprising:
    an electric power generator that is directly coupled with an engine, and is driven by the engine at a rotation frequency the same as that of the engine so as to generate AC electric power and supply electric power to a load apparatus;
    a rotation frequency detector that detects a rotation frequency of the electric power generator;
    an electric-power conversion system that performs electric power conversion between the electric power generator and a load apparatus;
    an electric-power conversion system control unit that PWM-controls the electric-power conversion system, based on a control command;
    an integrated control unit that issues a driving command and the control command to the engine control unit and the electric-power conversion system control unit, respectively, based on requested electric power from the load apparatus; and
    a limiter that limits the control command from the integrated control unit,
    wherein the limiter device is configured to limit the control command in such a way that in a transient mode where the rotation frequency of the electric power generator is lower than that in a steady mode where a value of torque of the engine and a value of torque of the electric power generator coincide with each other and the value of torque of the electric power generator corresponding to the requested electric power is larger than the value of torque of the engine, the value of torque of the electric power generator becomes smaller than the value of torque of the engine,
    wherein the electric power generator is controlled based on the limited control command to be brought into the steady mode by the rotation frequency of the electric power generator increasing from that in the transient mode, and supplies the requested electric power to the load apparatus in the steady mode,
    wherein the engine control unit includes an engine torque characteristic map indicating an engine torque characteristic corresponding to the rotation frequency of the engine and controls a fuel injection amount, in accordance with engine torque that is extracted from the engine torque characteristic map, based on the rotation frequency detected by the rotation frequency detector and the driving command,
    wherein the integrated control unit includes an electric power generator torque characteristic map indicating an electric power generator torque characteristic corresponding to the rotation frequency of the electric power generator and creates an electric power generator torque command value corresponding to electric power generator torque that is extracted from the electric power generator torque characteristic map, based on the rotation frequency detected by the rotation frequency detector and the requested electric power, and
    wherein the electric-power conversion system control unit PWM-controls the electric-power conversion system, based on the electric power generator torque command value created by the integrated control unit,
    wherein the limiter includes a limiting characteristic set in such a way that the value of torque of the electric power generator corresponding to a predetermined rotation frequency or lower is smaller than the value of torque of the engine corresponding to the predetermined rotation frequency or lower and limits the electric power generator torque command value created by the integrated control unit, based on the limiting characteristic.

2. The electric power generator control apparatus according to claim 1, wherein the driving command is a speed command for the engine.

3. The electric power generator control apparatus according to claim 1, wherein the limiting characteristic is set by a straight line that connects the intersection point of a torque value smaller than the maximum value of torque in the engine torque characteristic with the electric power generator torque characteristic with a point at which the rotation frequency is lower the predetermined rotation frequency and the electric power generator torque is zero.

4. The electric power generator control apparatus according to claim 1,
    wherein the engine torque characteristic map includes a plurality of engine torque characteristics, and
    wherein based on the driving command, the engine control unit selects and utilizes one of the plurality of engine torque characteristics.

5. The electric power generator control apparatus according to claim 4, wherein the driving command issued from the integrated control unit to the engine control unit is a notch command for selecting one of the plurality of engine torque characteristics.

6. The electric power generator control apparatus according to claim 4,
    wherein, in the selected one of the engine torque characteristics, the predetermined value of the rotation frequency of the electric power generator is a rotation frequency value on a lower side of rotation frequency conditions in which the electric power generator torque characteristic and the engine torque characteristic are equal to each other.

7. The electric power generator control apparatus according to claim 1,
    wherein the electric power generator torque characteristic map includes a plurality of electric power generator torque characteristics, and
    wherein based on the control command, the electric-power conversion system control unit selects and utilizes one of the plurality of electric power generator torque characteristics.

8. The electric power generator control apparatus according to claim 1, wherein the limiter includes a plurality of limiting characteristics corresponding to the plurality of electric power generator torque characteristics.

9. The electric power generator control apparatus according to claim 1, wherein the limiter includes a common engine torque limiting characteristic lying across the plurality of electric power generator torque characteristics and limits the electric power generator torque command value created by the integrated control unit, based on the common engine torque limiting characteristic.

10. The electric power generator control apparatus according to claim 1, wherein when the steady mode includes a first steady mode and a second steady mode having a rotation frequency higher than the rotation frequency in the first steady mode, and when the rotation frequency of the electric power generator in the transient mode is higher than the rotation frequency in the first steady mode and is the same as or lower than the rotation frequency in the second steady mode, acceleration torque of the engine which is a value obtained by subtracting the value of torque of the electric power generator from the value of torque of the engine becomes a positive value, so that the rotation frequency increases from that in the transient mode, and that the transient mode converges at the second steady mode.

11. The electric power generator control apparatus according to claim 10, wherein when the rotation frequency of the electric power generator in the transient mode is higher than the rotation frequency in the second steady mode, the acceleration torque becomes a negative value, so that the rotation frequency decreases from that in the transient mode, and that the transient mode converges at the second steady mode.

* * * * *